United States Patent [19]
Bauer et al.

[11] 3,923,321
[45] Dec. 2, 1975

[54] SAFETY BELT ARRANGEMENT

[75] Inventors: Andreas Bauer, Fallersleben; Bernhard Ruhmann, Braunschweig, both of Germany

[73] Assignee: Volkswagenwerk Aktiengesellschaft, Wolfsburg, Germany

[22] Filed: Sept. 10, 1974

[21] Appl. No.: 504,830

[30] Foreign Application Priority Data
Sept. 12, 1973  Germany............................ 2345847

[52] U.S. Cl. ........................:... 280/150 SB; 297/389
[51] Int. Cl.² ......................................... B60R 21/10
[58] Field of Search ................. 280/150 SB; 297/389

[56] References Cited
UNITED STATES PATENTS

| | | | |
|---|---|---|---|
| 2,880,788 | 4/1959 | Phillips.......................... | 280/150 SB |
| 3,521,901 | 7/1970 | Wackym ........................ | 280/150 SB |
| 3,583,726 | 6/1971 | Lindblad ....................... | 280/150 SB |
| 3,620,569 | 11/1971 | Mathis...................... | 280/150 SB X |
| 3,804,430 | 4/1974 | Fiala............................. | 280/150 SB |
| 3,829,123 | 8/1974 | Holka........................... | 280/150 SB |

Primary Examiner—Robert R. Song
Attorney, Agent, or Firm—Brumbaugh, Graves, Donohue & Raymond

[57] ABSTRACT

A safety belt arrangement for a vehicle seat includes a shoulder safety belt mounted at one end adjacent the seat portion of the vehicle seat. A positioning device disposes the safety belt so that the belt extends from its mounting point adjacent the seat portion of the seat diagonally across the back portion of the seat to a holding point adjacent the back portion of the seat. The positioning device is preferably mounted on the rear of the frame for the back portion of the vehicle seat adjacent the shoulders of a passenger seated in the seat. The device is adjustable to vary, at least in a vertical direction, the location of the holding point to which the seat belt extends. Since the positioning device is adjustable, the shoulder safety belt can be adjusted to the most favorable and effective position for an occupant of the seat.

17 Claims, 5 Drawing Figures

SAFETY BELT ARRANGEMENT

BACKGROUND OF THE INVENTION

Many conventional safety belt arrangements for motor vehicles, for example, utilize a diagonal shoulder belt that extends across a passenger's body from one shoulder to the opposite hip. Such a diagonal shoulder belt is usually combined with a lap belt to form a three-point safety belt that requires only three connections to secure the ends of the combination belt to the body of the associated motor vehicle. Most safety belts are also secured at their ends to the floor, a side wall or a door of a vehicle. Nonetheless, some safety belts are secured to other parts of a vehicle, such as an associated seat, and some belts are merely held adjacent other parts of a vehicle, while being secured to the vehicle floor, for example. Bombach U.S. Pat. No. 3,618,975 describes and illustrates a three-point combination safety belt having its ends secured to the floor of an automobile, while the shoulder belt portion of the combination belt is also held at a point adjacent the roof of the automobile.

In safety belt arrangements utilizing a combination belt that is mounted at least at one point on an associated seat, the upper mounting or holding point of the shoulder belt is customarily located at a fixed height above the horizontal cushion for the seat. Depending upon the height of a passenger occupying the seat, therefore, the shoulder belt assumes a more or less favorable and effective position on the body of the passenger. As the size of the passenger deviates farther from the median passenger size, particularly for very large or small passengers, the location of the diagonal shoulder belt is very unfavorable and provides insufficient retaining action for the upper portion of the passenger's body in the event of a collision. The belt may actually increase the likelihood of injuries to the passenger, especially in the area of his neck.

SUMMARY OF THE INVENTION

The present invention is directed to a safety belt arrangement for a seat in a vehicle, such as an automobile, which provides an especially effective shoulder safety belt through the use of a positioning and holding device for the upper portion of the belt, which is adjustable to accommodate passengers of varying heights. A safety belt arrangement, according to the invention, includes a safety belt for restraining the body of a passenger against an associated vehicle seat. The safety belt is mounted on the vehicle at a first point adjacent to the generally horizontal seat portion of the seat. A positioning device insures that at least a portion of the safety belt extends from the lower mounting point to a second point adjacent the back portion of the vehicle seat. The second point is spaced both vertically and in a direction transverse of the vehicle seat from the first point. Accordingly, the safety belt extends diagonally across the back portion of the vehicle seat and across an upper portion of the body of a passenger seated in the vehicle seat. To accommodate passengers of different heights, the positioning apparatus is adjustable so as to vary, at least in a vertical direction, the location of the second point to which the seat belt extends.

In one embodiment, the positioning device includes a bracket member that contacts the safety belt and defines the second point to which the belt extends. The bracket has a frame and at least one bar mounted in the frame. The safety belt extends over and is supported by the bar. The frame defines a pair of opposed slots and a plurality of evenly spaced apart openings are formed in the frame. A guide member, including an elongated guide strip, mounts the bracket member and is secured on a structural member coupled to the vehicle body. The guide strip has opposed side edges that are received in the opposed slots of the bracket member so that the strip is slidably movable in the slots and the bracket member is movable relative to the guide member. The bracket member is moved relative to the guide member by an actuating mechanism that includes a frame mounted so as to be immovable relative to the guide member. A rotatable shaft is journaled in the frame and a gear is secured to the shaft so that the gear engages the openings in the frame of the bracket member. Rotation of the shaft of the actuating mechanism causes the attached gear to engage successive openings in the bracket member and to move the bracket member relative to the guide member. The guide member is preferably mounted on the rear of the frame for the back portion of the vehicle seat and is oriented diagonally of the vertical central axis of the back portion of the seat.

The actuating mechanism can be locked when the relative positions of the bracket member and the guide member are not being adjusted, so that unintentional displacement of the bracket member on the guide member is prevented. The mechanism, therefore, includes a toothed element secured to the shaft of the mechanism and a second, cooperating toothed element secured to the frame of the mechanism. The rotatable shaft is axially movable within the frame and a spring within the actuating mechanism biases the shaft so that toothed element secured to the shaft normally engages the toothed element secured to the frame. To release the shaft for rotation and adjustment of the bracket member relative to the guide member, the shaft is moved axially against the biasing action of the spring so that the toothed element secured to the shaft is disengaged from the toothed element secured to the frame of the adjusting mechanism.

While the positioning device may mount one end of the safety belt on the frame of the back portion of the vehicle seat, the device preferably guides the belt downwardly along the rear of the back portion of the seat. In a positioning device that also guides the safety belt, the end of the belt can be mounted on the seat frame by a conventional automatic winding spool that winds up excess safety belt which is not in use. Moreover, the safety belt arrangement may also include a tensioning device that removes excess slack from the belt and tightens the belt around the body of a passenger in response to a signal from a sensor that is responsive to a condition normally indicative of an impending collision. If the winding spool and tensioning device are both mounted on the frame for the back portion of the vehicle seat, the safety belt extends underneath the upholstery covering for the seat from the positioning device to the tensioning device and the winding spool. The tensioning device may be mounted on the frame for the seat so as to pivot about an axis that is generally parallel to the central vertical axis of the seat back. On impact of a passenger against the back of the seat, the tensioning device can pivot away from the impact load and thereby prevent injuries to the passenger's back.

The safety belt arrangement of the present invention is particularly advantageous when the arrangement forms part of a passive safety device in which one mount for the safety belt is coupled to a vehicle door adjacent the seat with which the safety belt arrangement is used. In such a passive safety device, the lower mounting point for the shoulder belt may include a guide element that moves along the length of an elongated guide slot formed in the inner wall of the vehicle door. Through the action of a lever system inside the vehicle door, the belt is raised relative to the vehicle seat upon opening the vehicle door. Conversely, upon closing the vehicle door, the safety belt is lowered relative to the vehicle seat so that the belt assumes its proper restraining position about the body of a passenger seated in the seat. The adjustable positioning device of the invention permits the second or upper point to which the shoulder belt extends to be adjusted sufficiently high that the safety belt only negligibly obstructs entry into or exit from the vehicle when the vehicle door is open and the belt is raised relative to the vehicle seat.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF AN EMBODIMENT

Figure 1:
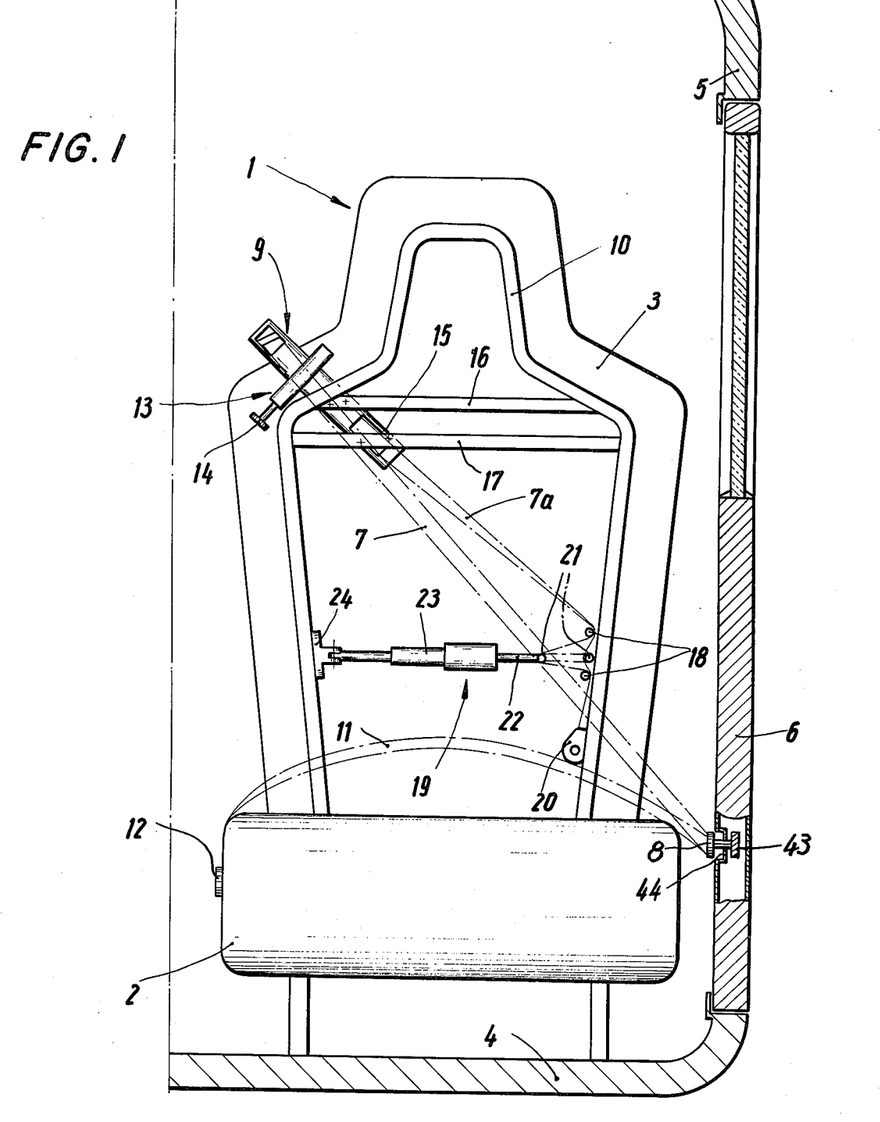
FIG. 1 is a front view of a vehicle seat equipped with a safety belt arrangement, according to the invention.
Figure 2:
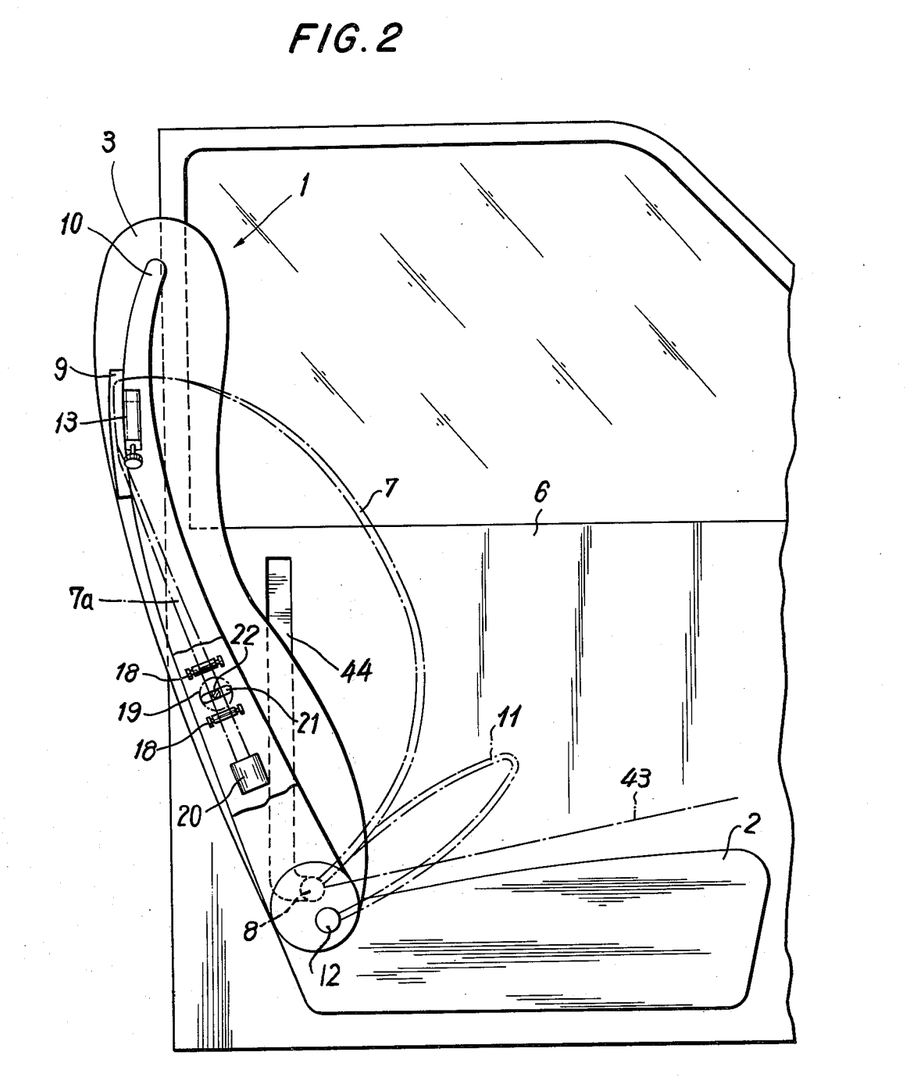
FIG. 2 is a side view of the vehicle seat of FIG. 1.

FIGS. 1 and 2 of the drawings illustrate a vehicle seat 1 installed in a passenger automobile. The seat 1 includes a seat or bench portion 2 and a back portion 3 that can be pivoted in a conventional manner about a generally horizontal transverse axis relative to the seat portion. The seat 1 is secured to the floor 4 of the automobile and the back portion extends upwardly from the seat portion 2 toward the roof 5 of the automobile. A three-point safety belt arrangement is associated with the seat 1 to secure a passenger against the seat. The three-point safety belt includes a diagonal shoulder belt 7 and a transverse lap belt 11. The lap belt 11 is mounted at one end by mount 12 on the frame (not shown) for the seat portion 2 of the seat 1. The other end of the lap belt 11 is mounted, together with one end of the shoulder belt 7, by a mounting bracket 8 on an adjacent door 6 of the automobile. The shoulder belt 7 extends from the mounting bracket 8, which is located adjacent to the seat portion 2 of the seat 1, diagonally across the back portion 3 of the seat. An upper holding point for the shoulder belt 7 is defined by a positioning device 9 located adjacent the upper part of the back portion 3 of the seat, in the general region of one shoulder of an occupant of the seat.

The should belt 7 extends over a guide bar or bolt 27a mounted in the positioning device 9 and the end portion 7a of the belt then extends down through the device and across the rear side of the back portion 3 of the seat 1, in a direction generally opposite the direction in which the belt extended from the mounting bracket 8. After passing through the positioning device 9, the belt portion 7a extends through the outer upholstery covering for the back portion 3 of the seat 1. Underneath the covering, the belt end portion 7a is taken up on a conventional automatic winding spool 20 that is secured to the frame 10 for the back portion 3 of the seat 1. Before reaching the winding spool 20, the end portion 7a of the shoulder belt 7 runs over a pair of vertically spaced apart rollers 18. Intermediate the two rollers 18, the belt portion 7a is engaged by a hook 21 extending from a belt tensioning device 19.

The tensioning device 19 includes a cylinder 23 and a reciprocable piston (not shown) in the cylinder. A piston rod 22 secured to the piston extends from the cylinder 23 and mounts the hook 21 at one end. An explosive charge is provided in the tensioning device 19 so that the cylinder 23 may be pressurized instantaneously to force the piston, the piston rod 22 and the hook 21 to the left, as viewed in FIG. 1. The leftward movement of the hook 21, to the position shown in full in FIG. 2, removes any slack existing in the diagonal shoulder belt 7 and tensions the shoulder belt about the body of a passenger seated in the seat 1. The explosive charge is detonated in a conventional manner immediately before a collision, in response to a signal from an appropriate sensor (not shown). The sensor is conventional (e.g. a collision sensor described in the US-Patent application Ser. No. 564,573 filed Apr. 10, 1974) and may be responsive to any selected condition normally indicative of an impending collision between automobile in which the sensor is mounted and some other object. The tensioning of the safety belt 7 by the tensioning device 19 also insures a simultaneous locking of a locking mechanism (not shown) in the winding spool 20 to prevent the spool from unwinding the safety belt. A force limiter may also be integrated into the winding spool 20 so that, upon exceeding a predetermined force or load on the safety belt 7, the force limiter yields to prevent injuries to the passenger from the safety belt 7.

Figure 3:
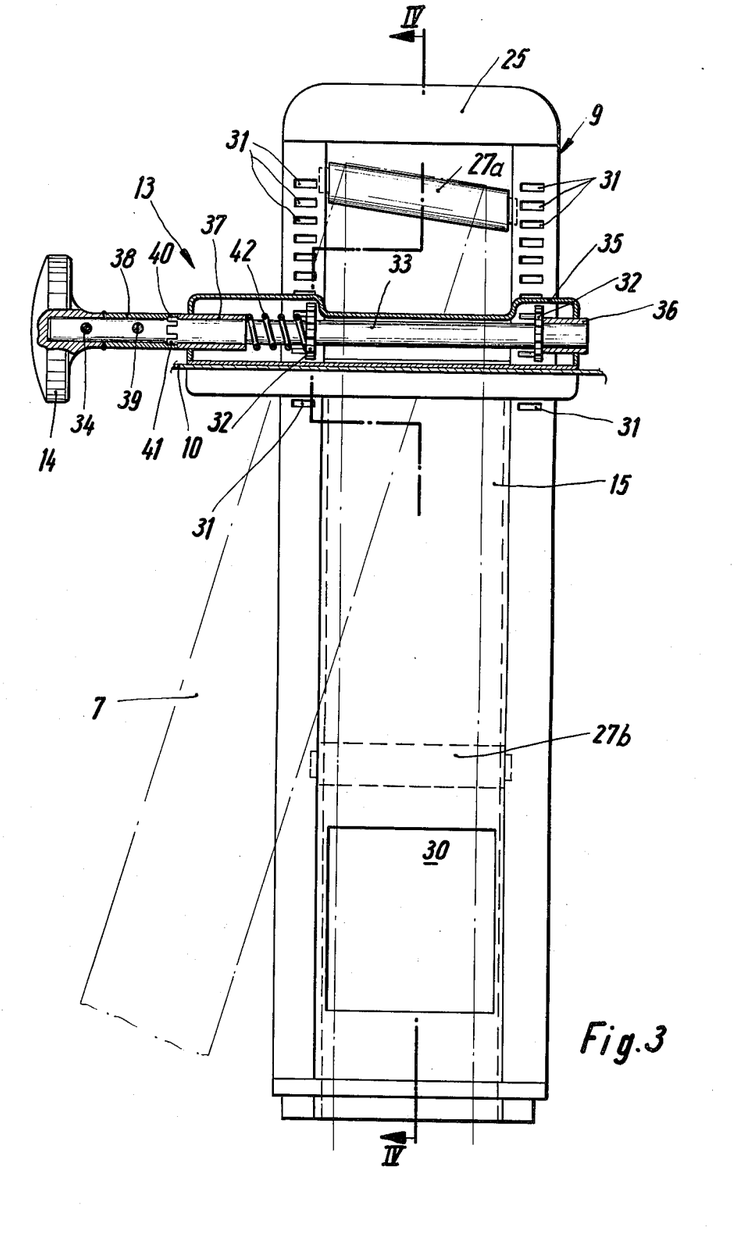
FIG. 3 is an enlarged plan view of the positioning device illustrated in FIGS. 1 and 2.
Figure 4:
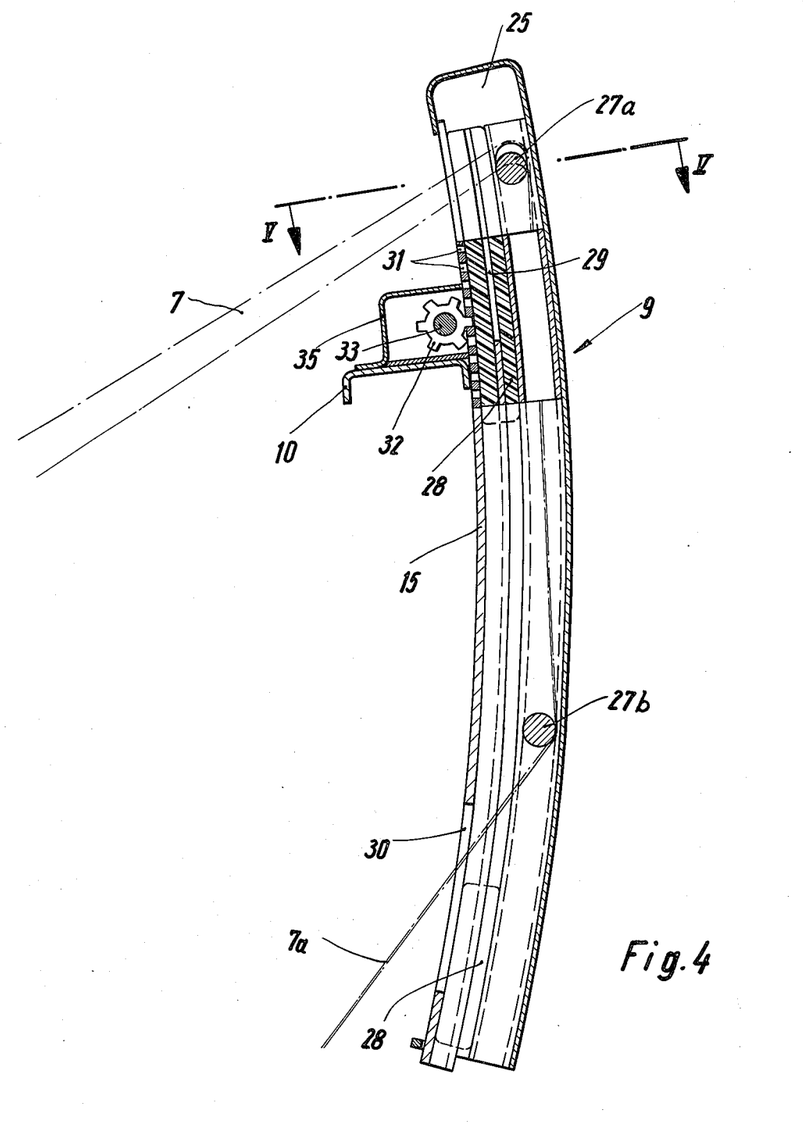
FIG. 4 is a sectional view taken along view line IV—IV of FIG. 3.
Figure 5:
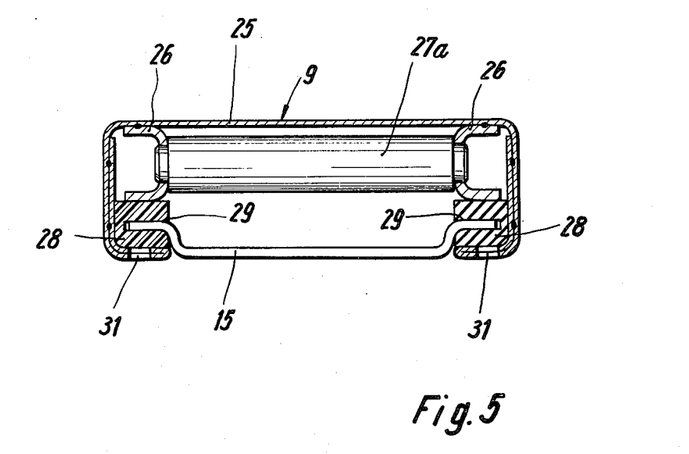
FIG. 5 is a sectional view taken along view line V—V of FIG. 4.

As shown in FIG. 1, the safety belt tensioning device 19 extends horizontally across the back of the seat 1 and is pivotally mounted at one end on the frame 10 for the back portion 3 of the seat by a hinge-like bracket 24. The bracket 24 permits the tensioning device 19 to pivot about a generally vertical axis toward and away from the back of the seat 1. Accordingly, if a passenger seated in the seat 1 is forced, as a result of a collision impact, against the back portion 3 of the seat, the tensioning device 19 will swing away from the passenger's back and thereby prevent serious injuries to the passenger's back FIGS. 3 to 5 of the drawings illustrate, on an enlarged scale, the positioning device 9 that defines an upper holding point for the diagonal shoulder belt 7. The positioning device 9 includes a box-like bracket or housing 25 that is supported by a guide strip or plate 15. As can best be seen in FIG. 4, the bracket 25 and the guide strip 15 of the positioning device 9 are curved concavely relative to their front faces so as to conform with the contour of the back portion 3 of the seat 1. The front face and the lower end of the box-like bracket 25 are substantially open. In cross section, as shown in FIG. 5, the bracket 25 has, between its front and rear faces, two pairs of supports 26, each pair of supports 26 mounting the ends of a guide bar or bolt 27a or 27b. As shown in FIG. 3, the upper guide bar 27a initially contacts the shoulder belt 7 and supports the belt. After the safety belt 7 passes over the guide bar 27a at the upper end of the bracket 25, the end portion 7a of the belt extends toward the lower guide bar 27b and then passes out of the positioning device 9 through an opening 30 cut in the guide strip 15 adjacent its lower end. While the lower guide bar 27b is oriented generally perpendicular to the central longitudinal axis of the bracket 25, the upper guide bar 27a is tilted at a different angle relative to the longitudinal axis of the bracket.

The supports 26 for the upper guide bar 27a, at least, help mount plastic guide rails 28 that each have a U-shaped cross-section to define a central slot 29. Four guide rails 28 are disposed in two pairs, one pair adjacent each end of the bracket 25. The opposed slots 29 of the guide rails 28 receive the side edges of the guide strip or plate 15 that is welded, or otherwise rigidly secured, to two vertically spaced apart cross-braces 16 and 17 for the frame 10 of the back portion 3 of the seat.

Since the guide strip 15 is received in the slots 29 of the guide rails 28 and since the bracket 25 has an open lower end, the bracket can slide relative to the guide strip. To actuate and control relative movement between the guide strip 15 and the bracket 25, and actuating mechanism 13 is mounted on the frame 10 of the back portion 3 of the seat 1. The actuating mechanism 13 includes a housing or frame 35 rigidly secured to the seat frame 10 and providing two bearings 36 and 37 that journal opposite ends of a rotatable shaft 33. Adjacent each of the bearings 36 and 37, the shaft 33 carries a toothed gear 32 that engages a series of adjacent, evenly spaced apart cutouts or openings 31 formed in the front face of the slidable bracket 25. When the shaft 33 of the actuating mechanism 13 is rotated, therefore, the gears 32 engage successive cutouts 31 so as to displace the slidable bracket 25 upward or downward relative to the actuating mechanism 13 and the guide strip 15, both of which are rigidly secured to the frame of the seat 1. The shaft 33 of the actuating device 13 is manually rotated by turning a knob 14 secured to one end of the shaft with a pin 34 that extends through the knob and the shaft.

In order to prevent the positioning device 9 from being adjusted unintentionally, the device can be locked in any selected position. To facilitate such locking, a biasing spring 42 encircles the shaft 33 and contacts, at one end, the bearing 37 and, at its other end, the left-hand gear 32. The spring 42 thus biases the shaft 33 axially to the right, as viewed in FIG. 3. Adjacent the hand engageable knob 14 is a sleeve 38 that slips over the actuating shaft 33 and is secured to tha shaft by a pin 39, similar to the pin 34. The end of the sleeve 38 away from the actuating knob 14 is machined to provide a plurality of gear teeth 40 that can cooperatively engage a similar plurality of gear teeth 41 formed on the adjacent end of the bearing 37.

In order to adjust the positioning device 9, the passenger in the seat grasps the knob 14 and pulls the knob and the shaft 33 to the left, as viewed in FIG. 3. The axial displacement of the shaft 33 disengages the cooperating teeth 40 and 41 and permits the shaft to be rotated. The axial displacement of the shaft 33 is limited by the teeth of the gear wheels 32 striking the edges of the cutouts or openings 31 with which the gear teeth are engaged. With the cooperating teeth 40 and 41 disengaged, the shaft 33 is rotated to engage the teeth of the gear wheels 32 with successive cutouts 31 and move the bracket 25 of the positioning device 9 relative to the guide strip 15 and the actuating device 13. After a desired adjustment of the positioning device 9 has been made, the knob 14 is released and the biasing action of the spring 42 moves the shaft 33 to the right, as viewed in FIG. 3, so that the cooperating teeth 40 and 41 engaged to lock the shaft 33 in the selected position.

The positioning device 9 described above permits an upper holding point for the diagonal shoulder belt 7 to be adjusted relative to the back portion 3 of the seat 1 to accomodate variations in the size of a passenger occupying the seat. The bracket 25 of positioning device 9 can be raised, relative to its position for an average size passenger, for larger passengers and lowered for smaller passengers. The shoulder belt 7 thus assumes a position in the region of a passenger's shoulders regardless of his size. As can be seen in FIG. 2, the positioning device 9 is mounted on the frame 10 for the back portion 3 of the seat 1 so that adjustment is achieved on an incline with the respect to the center line of the back portion of the seat. Such an arrangement takes into consideration not only the height of the shoulders of a passenger, which varies with the passenger's body size, but also the variable width of a passenger's shoulders. In order to avoid injuries to the passenger from the positioning device 9, the device is mounted behind or on the rear surface of the frame 10 for the back portion 3 of the seat 1.

In the embodiment of the invention illustrated in the drawings, both the upper holding point for the shoulder belt 7 and the left-hand mount 12 for the lap belt 11 are secured to the frame of the seat 1. While the common mounting bracket 8 for the other ends of the shoulder belt 7 and the lap belt 11 might also be mounted on the frame of the seat 1 or immovably fixed on the adjacent door 6, the bracket 8 is coupled to a lever system inside the automobile door 6 and the bracket 8 travels in a guide slot 44 formed in the interior wall of the door. The lever system that mounts the bracket 8 defines a passive actuating device for the safety belt arrangement illustrated in the drawings.

The lever system includes a lever pivotally mounted in the door 6 of the automobile, which includes two interconnected arms oriented at an angle to each other with one arm 43 carrying the mounting bracket 8. The other arm (not shown) of the two-armed lever is coupled to a stop (not shown) that limits outward opening movement of the door 6. Upon opening of the door 6, the lever arm 43 is pivoted into a position in which the bracket 8 is at the upper end of the guide slot 44 and the safety belt is raised relative to the seat 1. Upon closing of the vehicle door 6, the lever arm 43 is pivoted into a position in which the bracket 8 is at the lower end of the guide slot 42, as shown in FIG. 2, and the safety belt is lowered relative to the seat 1.

A more detailed description of the foregoing passive actuating device, appearing in commonly-owned, co-pending United States patent application Ser. No. 442,076, filed Feb. 13, 1974, is incorporated by reference herein. The use of a passive actuating device offers special advantages because it moves the associated safety belt into a proper restraining position automatically without any effort on the part of the passenger, such as required to manipulate belt buckles or locks.

Although the illustrated embodiment of the invention is shown with the holding points or mounts for the safety belts 11 and 7 located on the seat frame and an associated door 6 of an automobile, it is within the scope of the invention to adapt the inventive seat belt arrangement to mounting systems in which the mounting points for the individual belts are located on the floor and/or lateral frame portions of a vehicle. In such systems, a device corresponding to the illustrated positioning device 9 would be mounted on a lateral frame member of a vehicle so that the position of the upper holding point for the shoulder belt 7 could be adjusted to the particular occupant of the seat.

It will be understood that the embodiment described above is merely exemplary and that persons skilled in the art may make many variations and modifications without departing from the spirit and scope of the invention. All such modifications and variations are intended to be within the scope of the invention as defined in the appended claims.

We claim:

1. A safety belt arrangement for a vehicle seat having a seat portion and a back portion extending upwardly from the seat portion, said arrangement comprising:
   a. a safety belt for restraining the body of a passenger against the vehicle seat;
   b. means for mounting the safety belt at a first point adjacent the seat portion of the vehicle seat; and
   c. means for positioning the safety belt so that at least a portion of the safety belt extends from the first point in a direction transverse of the vehicle seat to a second point that is adjacent the back portion of the vehicle seat, said portion of the safety belt extending diagonally across the back portion of the vehicle seat and being adapted to extend diagonally across an upper portion of the body of a passenger seated in the vehicle seat, the positioning means being adjustable selectively to vary the location of the second point at least in a vertical direction, wherein the positioning means includes:
      i. bracket means holding the safety belt and defining the second point to which the portion of the safety belt extends;
      ii. guide means mounting the bracket means so that the bracket means is movable relative to the guide means, the guide means being secured on a structural member coupled to the vehicle body; and
      iii. actuating means operatively engaging the bracket means with the guide means for selectively moving the bracket means relative to the guide means.

2. A safety belt arrangement according to claim 1, wherein the actuating means is adapted to lock the bracket means in a selected position relative to the guide means and the structural member.

3. A safety belt arrangement according to claim 2, wherein the actuating means includes a frame, a rotatable and axially movable shaft journaled in the frame, a first toothed means secured to the shaft, a second toothed means secured to the frame, and spring means arranged to bias the shaft axially relative to the frame so that the two toothed means engage each other and thereby prevent rotation of the shaft relative to the frame.

4. A safety belt arrangement according to claim 1, wherein the bracket means includes means defining a plurality of spaced apart openings and the actuating means includes a frame mounted so as to be immovable relative to the guide means, a rotatable shaft journaled in the frame, and gear means secured to the shaft and adapted to engage the openings of the bracket means, rotation of the shaft of the actuating means causing the gear means to engage successive ones of the openings of the bracket means and to move the bracket means relative to the guide means and the actuating means.

5. A safety belt arrangement according to claim 1, wherein the bracket means includes a frame and at least one bar member mounted in the frame, the safety belt contacting the bar member and the bar member defining the second point to which the portion of the safety belt extends.

6. A safety belt arrangement according to claim 5, wherein the guide means includes an elongated guide strip and the frame of the bracket means includes means defining a pair of opposed slots for engaging opposite side edges of the elongated guide strip, the guide strip being slidably movable in the slots.

7. A safety belt arrangement according to claim 1, wherein the positioning means also guides the safety belt beyond the second point in a direction different from said direction transverse of the vehicle seat from the first point to the second point.

8. A safety belt arrangement according to claim 1, wherein the structural member is a frame member for the back portion of the vehicle seat.

9. A safety belt arrangement according to claim 8, wherein the guide means is oriented diagonally of an upwardly extending central axis of the back portion of the vehicle seat.

10. A safety belt arrangement according to claim 8, wherein the guide means is mounted on a side of the frame member facing away from a passenger seated in the vehicle seat.

11. A safety belt arrangement according to claim 1, further comprising automatic means for winding up at least a portion of the safety belt.

12. A safety belt arrangement according to claim 1, further comprising means for applying a predetermined tension to the safety belt, the tension applying means being adapted for actuation only in response to an appropriate signal from a sensor that is responsive to a condition normally indicative of an impending collision between a vehicle in which the safety belt arrangement is mounted and another object.

13. A safety belt arrangement according to claim 12, further comprising automatic means for winding up at least a portion of the safety belt, and wherein the back portion of the vehicle seat has an outer upholstery covering and the winding up means and the tension applying means are secured to a frame for the back portion of the vehicle seat, the safety belt extending underneath the upholstery covering from the positioning means to the winding up means and the tension applying means.

14. A safety belt arrangement according to claim 12, wherein the tension applying means is pivotally mounted on a frame for the back portion of the vehicle seat, the tension applying means being pivotable about an axis that is generally parallel to an upwardly extending central axis of the back portion of the vehicle seat.

15. A safety belt arrangement according to claim 1, wherein the first point is located on a vehicle door adjacent the vehicle seat.

16. A safety belt arrangement according to claim 15, wherein an elongated guide slot is formed in an inner wall of the vehicle door, the mounting means includes a guide element movable along the length of the guide slot and the safety belt arrangement also comprises means for moving the guide element so that upon opening of the vehicle door, a portion of the safety belt adjacent the mounting means is raised relative to the vehicle seat and upon closing of the vehicle door, said portion of the safety belt adjacent the mounting means is lowered relative to the vehicle seat.

17. A safety belt arrangement for a vehicle seat having a seat portion and a back portion extending upwardly from the seat portion, said arrangement comprising:
   a. a safety belt for restraining the body of a passenger against the vehicle seat;
   b. means for mounting the safety belt at a first point adjacent the seat portion of the vehicle seat; and
   c. means for positioning the safety belt so that at least a portion of the safety belt extends from the first point to a second point that is adjacent the back portion of the vehicle seat and that is spaced both vertically and in a direction transverse of the vehicle seat from the first point, the portion of the safety belt thereby being adapted to extend diagonally across the back portion of the vehicle seat and across an upper portion of the body of a passenger seated in the vehicle seat, the positioning means including:
      i. bracket means contacting the safety belt and defining the second point to which the portion of the safety belt extends, the bracket means including a bracket frame and at least one bar member mounted in the frame, the bracket frame defining a pair of opposed slots and having formed in it a plurality of evenly spaced apart openings;
      ii. guide means mounting the bracket means and being secured on a structural member coupled to the vehicle body, the guide means including an elongated guide strip having opposed side edges received in the opposed slots of the bracket frame so as to be slidably movable in the opposed slots; and
      iii. actuating means for selectively moving the bracket means relative to the guide means, the actuating means including a frame mounted so as to be immovable relative to the guide means, a rotatable shaft journaled in the frame of the actuating means, a gear secured to the shaft and adapted to engage the openings of the bracket frame of the bracket means, and means for locking the shaft against rotation in a selected position, rotation of the shaft causing the gear to engage successive ones of the openings of the bracket means and to move the bracket means relative to the guide means and the actuating means.

* * * * *